(12) United States Patent
Ching (10) Patent No.: US 11,926,257 B2
(45) Date of Patent: Mar. 12, 2024

(54) MULTI-LIGHTING PROJECTION WARNING DEVICE FOR VEHICLE TURNING

(71) Applicant: Ya-Chi Ching, Yilan County (TW)

(72) Inventor: Ya-Chi Ching, Yilan County (TW)

( * ) Notice: Subject to any disclaimer, the term of this patent is extended or adjusted under 35 U.S.C. 154(b) by 51 days.

(21) Appl. No.: 17/836,032

(22) Filed: Jun. 9, 2022

(65) Prior Publication Data

US 2022/0297597 A1     Sep. 22, 2022

Related U.S. Application Data

(63) Continuation-in-part of application No. 17/202,015, filed on Mar. 15, 2021, now abandoned.

(30) Foreign Application Priority Data

Nov. 19, 2020 (TW) ................................. 109140630

(51) Int. Cl.
*B60Q 1/50* (2006.01)
*B60Q 1/00* (2006.01)
*B60Q 1/26* (2006.01)
*B60Q 1/32* (2006.01)
*B60Q 5/00* (2006.01)

(52) U.S. Cl.
CPC ........... *B60Q 1/525* (2013.01); *B60Q 1/0041* (2013.01); *B60Q 1/2607* (2013.01); *B60Q 1/32* (2013.01); *B60Q 5/006* (2013.01); *B60Q 2400/50* (2013.01)

(58) Field of Classification Search
CPC ...... B60Q 2400/50; B60Q 1/34; B60Q 9/008; B60Q 1/32; B60Q 1/484; B60Q 1/503; B60Q 2300/122; B60Q 2300/142; B60Q 1/381; B60Q 1/346; B60Q 1/36; B60Q 5/006; G01S 2013/9315; G01S 2013/932; G08B 21/00
USPC ......................................................... 340/475
See application file for complete search history.

(56) References Cited

U.S. PATENT DOCUMENTS

| | | | | |
|---|---|---|---|---|
| 7,843,362 | B2* | 11/2010 | Augst | B62D 15/027 340/435 |
| 9,845,046 | B1* | 12/2017 | Arceo | B60Q 1/525 |
| 10,118,537 | B2* | 11/2018 | Kunii | G08G 1/096725 |
| 10,351,054 | B2* | 7/2019 | Rodriguez Barros | ... B60Q 1/22 |
| 10,611,296 | B2* | 4/2020 | Kunii | G08G 1/096791 |
| 10,752,165 | B2* | 8/2020 | Omanovic | B60Q 1/22 |
| 11,052,818 | B2* | 7/2021 | Ching | B60Q 1/346 |

(Continued)

*Primary Examiner* — Eric Blount
(74) *Attorney, Agent, or Firm* — Li & Cai Intellectual Property (USA) Office (57) ABSTRACT

The invention discloses a multi-lighting projection warning device for vehicle turning, which comprises a composite lamp and a control unit. The composite lamp is arranged on one side of a vehicle and combined with a range indicator light, a contour indicator light, and a text or pattern indicator light, so that the composite lamp can project lighting to a visual blind spot when the vehicle turns or reverses to form a warning area. The control unit is connected to the composite lamp to enable functions of controlling rotation and start-stop lighting of the composite lamp. Thereby, when the vehicle is turning, the invention projects composite lightings on the ground at the turning side to form the warning area, so as to actively warn other passers-by to dodge the warning area and increase the safety of passers-by.

9 Claims, 8 Drawing Sheets

(56) References Cited

U.S. PATENT DOCUMENTS

| | | | | |
|---|---|---|---|---|
| 2013/0169425 A1* | 7/2013 | Victor | ................... | B60Q 9/008 |
| | | | | 340/435 |
| 2014/0313756 A1* | 10/2014 | Thomson | ............... | B60Q 1/247 |
| | | | | 362/512 |
| 2015/0203026 A1* | 7/2015 | Schotanus | ............ | B60Q 1/2615 |
| | | | | 362/520 |
| 2016/0137124 A1* | 5/2016 | Lee | ........................ | G08G 1/165 |
| | | | | 340/435 |
| 2016/0363281 A1* | 12/2016 | Hsu | ........................ | F21S 45/50 |
| 2017/0210282 A1* | 7/2017 | Rodriguez Barros | . | B60Q 1/324 |
| 2020/0277008 A1* | 9/2020 | Tran | ......................... | B60R 1/00 |
| 2023/0087743 A1* | 3/2023 | Deng | .................... | B60W 50/14 |
| | | | | 701/1 |

* cited by examiner

MULTI-LIGHTING PROJECTION WARNING DEVICE FOR VEHICLE TURNING

CROSS-REFERENCE TO RELATED PATENT APPLICATION

This application claims the benefit of priority to Taiwan Patent Application No. 109140630, filed on Nov. 19, 2020. The entire content of the above identified application is incorporated herein by reference.

This application is a Continuation-in-Part of application Ser. No. 17/202,015 filed Mar. 15, 2021, now pending, and entitled multi-lighting projection warning device for vehicle turning.

FIELD OF THE DISCLOSURE

The invention relates to a vehicle warning device, in particular to a device for projecting a variety of lighting warnings in a blind spot area of a vehicle when the vehicle is turning, so as to actively provide a warning area for passers-by, reduce the collision accidents caused to pedestrians or other vehicles when the vehicle is turning, and improve road safety.

BACKGROUND OF THE DISCLOSURE

With the development of society, vehicles have become an indispensable product for modern people's life or work. Whether it is short-distance ride instead of walk or long-distance transportation, the use of vehicles has become an important part of most people's lives, and also provides people with convenient freedom of movement.

Accompanied by the widespread use of vehicles, traffic accidents have also become a normal social problem. There are many reasons for this problem, such as road obstacle, signal failure, poor vehicle condition, human factor, etc.; however, no matter what the reasons are, the tragedies caused are mostly irreparable and have a great impact.

For this reason, how to improve road safety is a topic that everyone needs to pay attention to and should not be careless. In addition to the special authorities should pay attention to the state of the road at all times and remove obstacles immediately, everyone should start by themselves and comply with laws and regulations, and never covet the convenience of the moment, so as to reduce the occurrence of man-made accidents.

However, in addition to the above situation that can be grasped, there are still some traffic accidents that are difficult to predict, most of which are related to the structure of the vehicle itself, causing accidents to happen endlessly.

In the case of a vehicle turning action, the rear wheel on the turning side will shift inward, so that the trajectory of the rear wheel will not coincide with that of the front wheel. The resulting gap is called the "difference of radius between inner wheels". The area of the difference of radius between inner wheels will form a visual blind spot for the vehicle driver, and will be enlarged as the volume of the vehicle increases. When a smaller object, such as a pedestrian or a motorcycle enters the difference of radius between inner wheels area, it is difficult for the driver to notice. Thus, if there is no other means of reminding, an accident in which a turning vehicle collides with a pedestrian or a cyclist may occur, resulting in serious casualty accidents.

To solve the problem of turning blind spot, some large vehicles have provided solutions, which are mainly to add more rear-view mirrors or photographic lenses. When the vehicle is turning, the image of the blind spot area is provided for the driver to observe immediately, so that the driver can handle it properly.

Nevertheless, the aforementioned solution can only provide reference information for the vehicle driver, but cannot warn other passers-by. In this way, even if the driver knows that someone has entered the visual blind spot and slowed down the speed, the person entering the visual blind spot is still unable to notice and is prone to collision with the vehicle.

Therefore, if the vehicle can actively issue a prompt warning to other passers-by on the turning side of the vehicle when the vehicle is turning, so that the passers-by can dodge, it will be more effective to reduce the collision accidents that occur when the vehicle is turning.

In view of the foregoing deficiencies, the inventor is actively conducting research and development, considering proactively providing external warning when the vehicle is turning to reduce the occurrence of traffic accidents. Through discussion and implementation, the multi-lighting projection warning device for vehicle turning can be completed.

SUMMARY OF THE DISCLOSURE

The main objective of the invention is to provide a multi-lighting projection warning device for vehicle turning, which projects warning lighting on the ground at the turning side when the vehicle is turning to actively warn other passers-by to dodge the warning area and increase the safety of passers-by.

Another objective of the invention is to provide a multi-lighting projection warning device for vehicle turning, which utilizes a variety of lightings to be projected simultaneously to make the warning area more clear and obvious, so that passers-by can more clearly dodge the warning area.

The other objective of the invention is to provide a multi-lighting projection warning device for vehicle turning, which is suitable for various types of vehicles, especially for large vehicles.

According to the foregoing objectives, the invention to be achieved is a multi-lighting projection warning device for vehicle turning, which comprises a composite lamp and a control unit.

The composite lamp is arranged on one side of a vehicle, which is combined with a range indicator light, a contour indicator light, and a text or pattern indicator light. The composite lamp projects lighting towards a visual blind spot of the turning vehicle to form a warning area when the vehicle is turning. Among them, the range indicator light is used to illuminate an entire range of the warning area, the contour indicator light is used to clearly mark a contour of the warning area, and the text or pattern indicator light is used to project text or pattern on the warning area to enhance warning effect.

The control unit is connected to the composite lamp, and enables functions of the control unit to control rotation, start-stop lighting of the composite lamp.

In the foregoing structure, the control unit separately or simultaneously adjusts color, brightness, clarity, flashing and other actions of the range indicator light, the contour indicator light, and the text or pattern indicator light.

Further, the control unit individually controls the rotation of the text or pattern indicator light to move or change the text or pattern within the entire range of the warning area.

Or, the control unit is connected to an external audible alarm, an internal audible alarm, a first visual alarm and a second visual alarm to send out audible and visual warning messages.

Furthermore, the control unit is connected to a blind spot detector, a steering angle detector and a rotating speed detector. The blind spot detector is capable of detecting an object which is entering the warning area. The steering angle detector is capable of detecting a turning angle of a steering wheel of the vehicle. The rotating speed detector is capable of detecting a rotational speed of a wheel of the vehicle. The steering angle detector and the rotating speed detector are configured to be activated after the object is detected by the blind spot detector.

Moreover, the control unit is configured to send out a first audible and visual warning message through the external audible alarm, the internal audible alarm and the first visual alarm when the object is detected by the blind spot detector. The control unit is further configured to determine whether, after the steering angle detector and the rotating speed detector are activated, the turning angle of the steering wheel of the vehicle is greater than a predetermined angle and the rotational speed of the wheel of the vehicle is higher than a predetermined speed. When the turning angle of the steering wheel of the vehicle is greater than the predetermined angle and the rotational speed of the wheel of the vehicle is higher than the predetermined speed, the control unit sends out a second audible and visual warning message through the internal audible alarm and the second visual alarm.

In addition, the control unit is connected to a parameter unit which records model, length and other information of the vehicle, so that the control unit can automatically adjust a projection direction and a range of the composite lamp to generate a best of the warning area of the vehicle.

Moreover, a lampshade is arranged on an outside of the composite lamp. A knob is arranged on an outside of the lampshade, and an angle of the composite lamp is adjustable by cooperation of the knob and the control unit so as to automatically adjust a range of the warning area.

In addition, a slit is arranged on the lampshade, so that an adjustable light ray of the contour indicator light passes through the slit to automatically project a brighter sharper line to define a side edge portion of the warning area that is adjustable.

And, a plurality of composite lamps can be simultaneously arranged on one side of the vehicle, so that the light rays projected by the plurality of composite lamps overlap each other to form the warning area conforming to the size of the vehicle.

Or, the composite lamp is additionally arranged behind the vehicle to project a warning area thereof.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 5, the invention provides a multi-lighting projection warning device for vehicle turning, which mainly includes a composite lamp 100 and a control unit 200.

Figure 1:
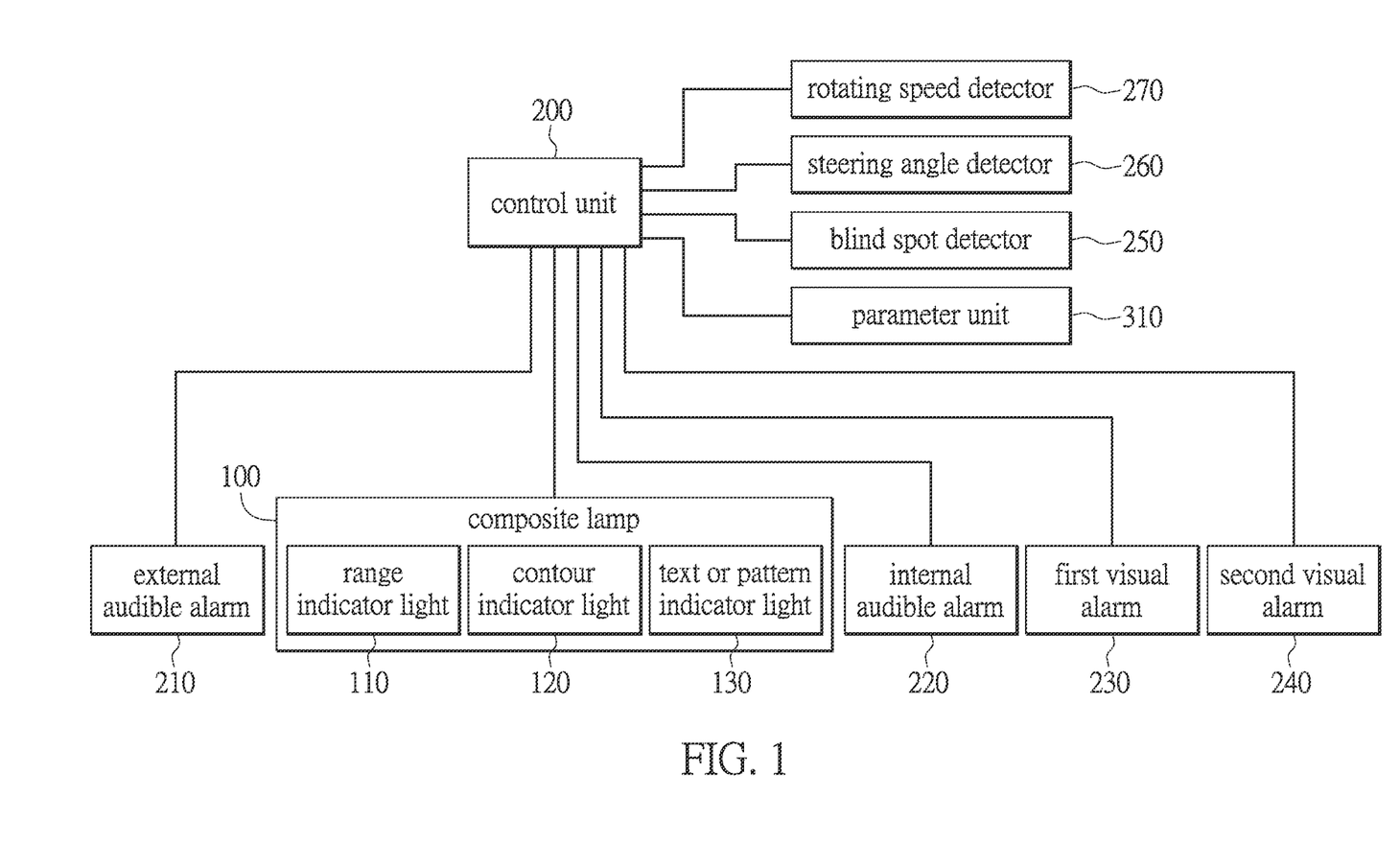
FIG. 1 is a block diagram of a structure composition according to the present disclosure.
Figure 2:
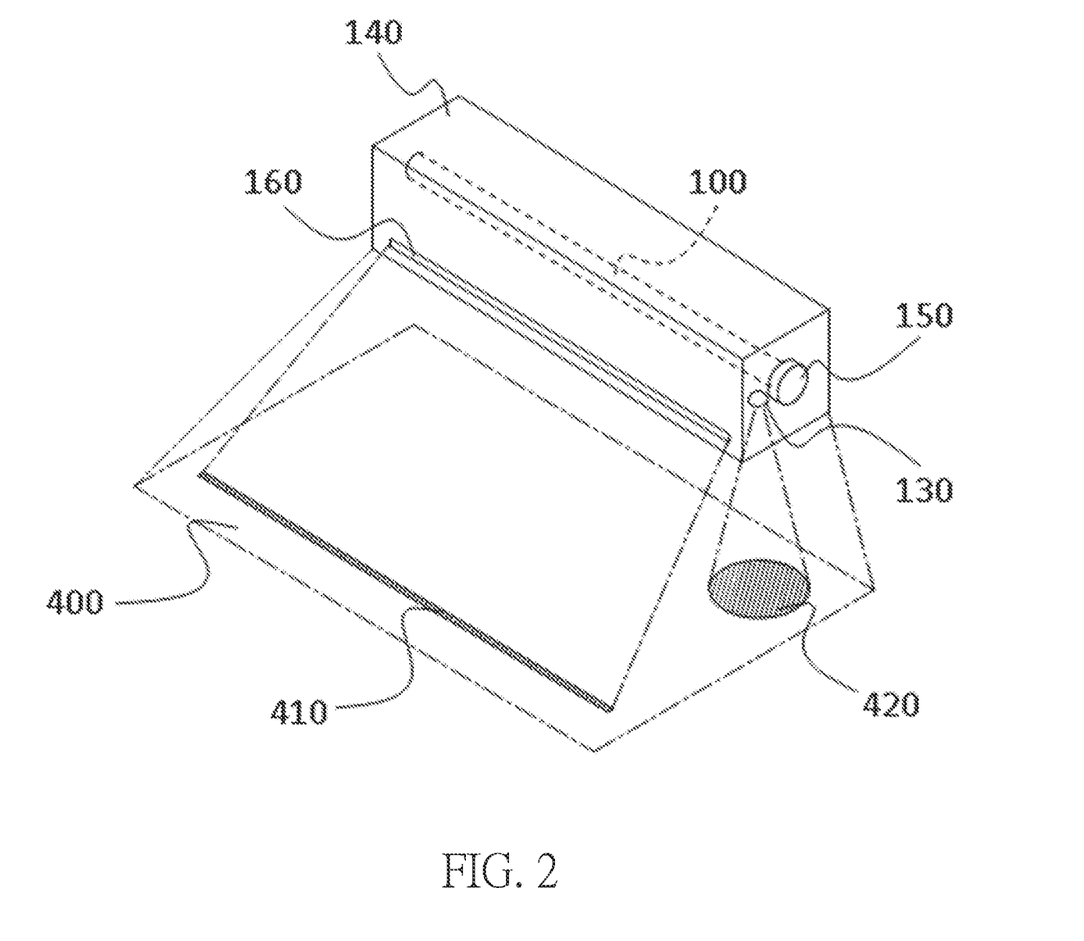
FIG. 2 is a schematic diagram of a composite lamp structure according to the present disclosure.
Figure 3:
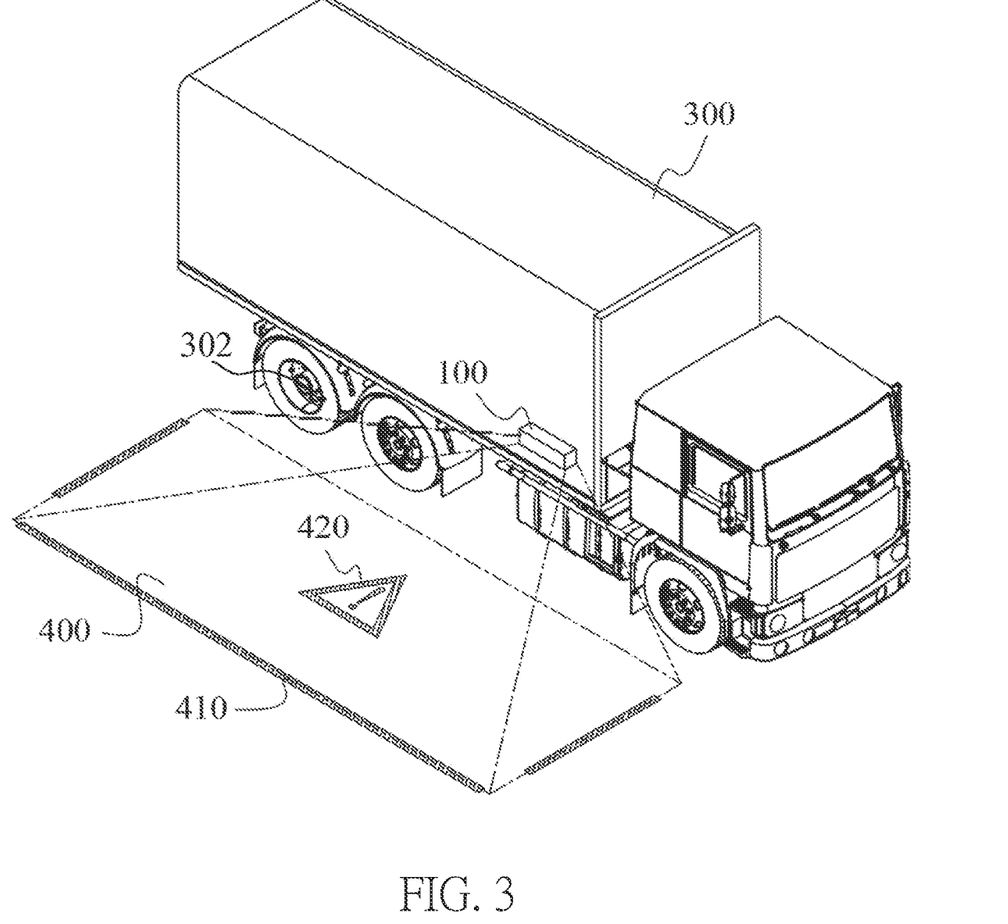
FIG. 3 is a diagram of an embodiment according to the present disclosure.

The composite lamp 100 is arranged on one side of a vehicle 300, which is combined with a range indicator light 110, a contour indicator light 120, and a text or pattern indicator light 130. The composite lamp 100 projects lighting towards a visual blind spot of the turning vehicle 300 to form a warning area 400 when the vehicle 300 is turning. Among them, the range indicator light 110 is used to illuminate an entire range of the warning area 400, the contour indicator light 120 is used to clearly mark a contour 410 of the warning area 400, and the text or pattern indicator light 130 is used to project text or pattern 420 on the warning area 400 to enhance warning effect.

The control unit 200 is connected to the composite lamp 100, and enables functions of the control unit 200 to control rotation, start-stop lighting of the composite lamp 100.

By means of the aforementioned structure, the invention projects three kinds of lightings on the warning area 400. Usually, for the general designer's thinking, only the entire range of the warning area 400 will be irradiated. However, in practice, due to the influence of weather, time, and road conditions, the lighting within the warning area 400 cannot be consistent, and its side edge is not obvious enough, which easy to make the overall lighting effect incomplete and it is difficult to provide useful warning effect for other passers-by 500. By using the design of the invention, in addition to the relatively vague entire range, the contour 410 of the warning area 400 can be clearly displayed to let the passers-by 500 follow. In addition, the vivid combination of the text or pattern 420 can actively warn the passers-by 500 to be careful to achieve the best effect.

To increase the warning effect, the control unit 200 can separately or simultaneously adjust the functions of the range indicator light 110, the contour indicator light 120, and the text or pattern indicator light 130, and make changes as needed. Then, it can also change the respective color, brightness, clarity, flashing and other actions of each lamp, and their combinations will become thousands, so it can naturally achieve the best effect. Of course, these warning actions must comply with relevant laws and regulations, and should not be too violent; otherwise it will have adverse effects on the passers-by 500.

With regard to the text or pattern indicator light 130, the control unit 200 may individually control the rotation of the text or pattern indicator light 130 to move or change the text or pattern 420 within the entire range of the warning area 400, or to make a marquee effect, so as to more clearly expose the entire range of the warning area 400.

Figure 4:
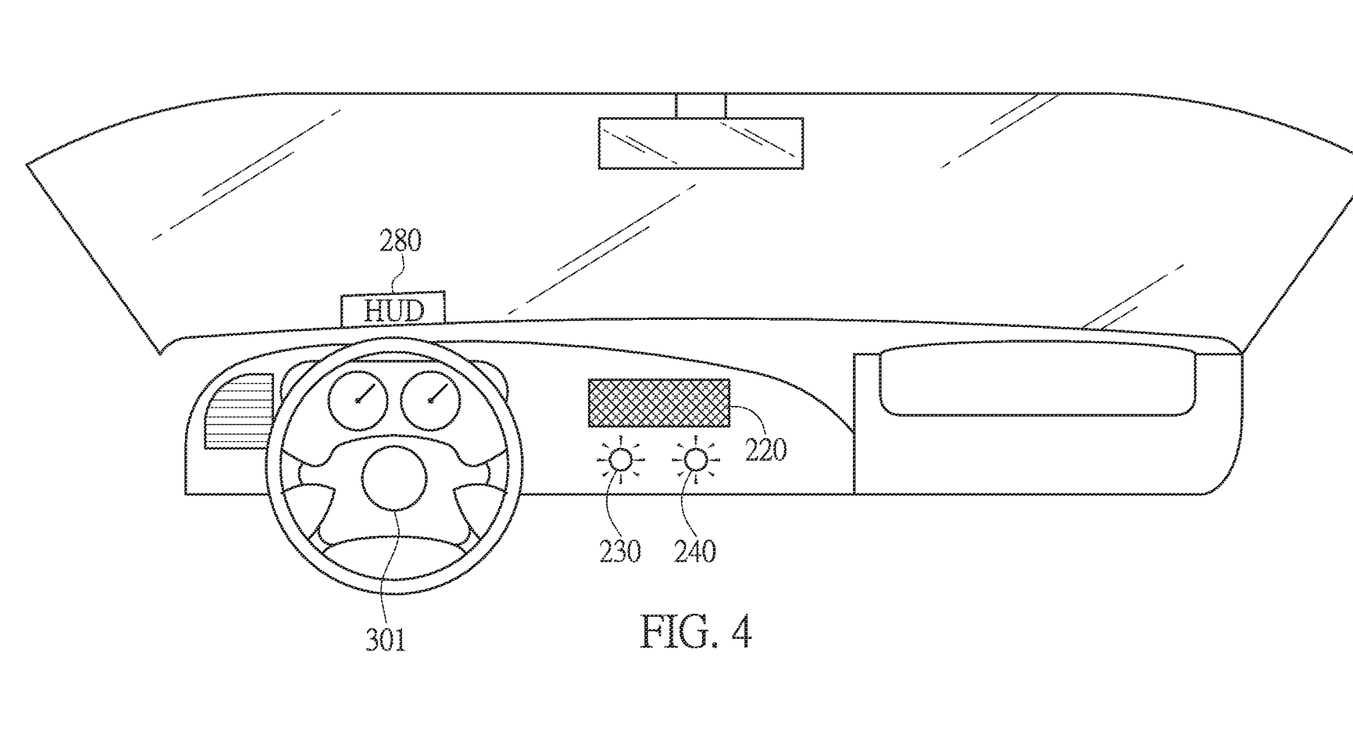
FIG. 4 is a schematic diagram of audible and visual alarms according to the present disclosure.

In addition to using lightings, the control unit 200 can also be connected to an external audible alarm 210, an internal audible alarm 220, a first visual alarm 230 and a second visual alarm 240 to send out audible and visual warning messages.

The external audible alarm 210 can be arranged on an outside of the vehicle 300. The internal audible alarm 220, the first visual alarm 230 and the second visual alarm 240 can be arranged on a dash of the vehicle 300. The external audible alarm 210 or the internal audible alarm 220 can be a loudspeaker or buzzer. The first visual alarm 230 or the second visual alarm 240 can be a flashing light alarm. Further, a head-up display (HUD) 280 arranged on the dash may serve as the first visual alarm 230 and/or the second visual alarm 240.

In addition, with regard to the composite lamp 100, a lampshade 140 is arranged on an outside of the composite lamp 100, which provides basic protection or waterproof, dustproof and heat dissipation functions. A knob 150 is arranged on an outside of the lampshade 140, which may control an angle of the composite lamp 100 to adjust a range of the warning area 400. Further, the angle of the composite lamp 100 is adjustable by cooperation of the knob 150 and the control unit 200 so as to automatically adjust a range of the warning area 400.

Furthermore, in order to facilitate the setting of the warning area 400 of the different vehicle 300, the control unit 200 of the invention can be connected to a parameter unit 310 which records the model, length and other information of the vehicle 300, so that the control unit 200 can automatically adjust a projection direction and a range of the composite lamp 100 according to the parameters of the vehicle 300 to generate a best warning area 400 of the vehicle 300.

A slit 160 is arranged on the lampshade 140, so that an adjustable light ray of the contour indicator light 120 passes through the slit 160 to automatically project a brighter sharper line to define a side edge portion of the adjustable warning area 400, so as to resolve the problem that the side edge portion of the adjustable warning area 400 is not obvious enough for passers-by 500.

In addition to the foregoing structure, referring to FIGS. 1, 4, 5 and 6, the control unit 200 is connected to a blind spot detector 250. The blind spot detector 250 may be a radar sensor, and can be installed together with the composite lamp 100 or separately installed at the front or rear of the vehicle 300. The blind spot detector 250 is capable of detecting an object which is entering the warning area 400. The control unit 200 is configured to send out a first audible and visual warning message through the external audible alarm 210, the internal audible alarm 220 and the first visual alarm 230 when the object is detected, so as to actively inform the vehicle driver regarding the condition of the detected object through the internal audible alarm 220 and the first visual alarm 230, while actively warning the object to dodge the warning area 400 through the external audible alarm 210.

Figure 6:
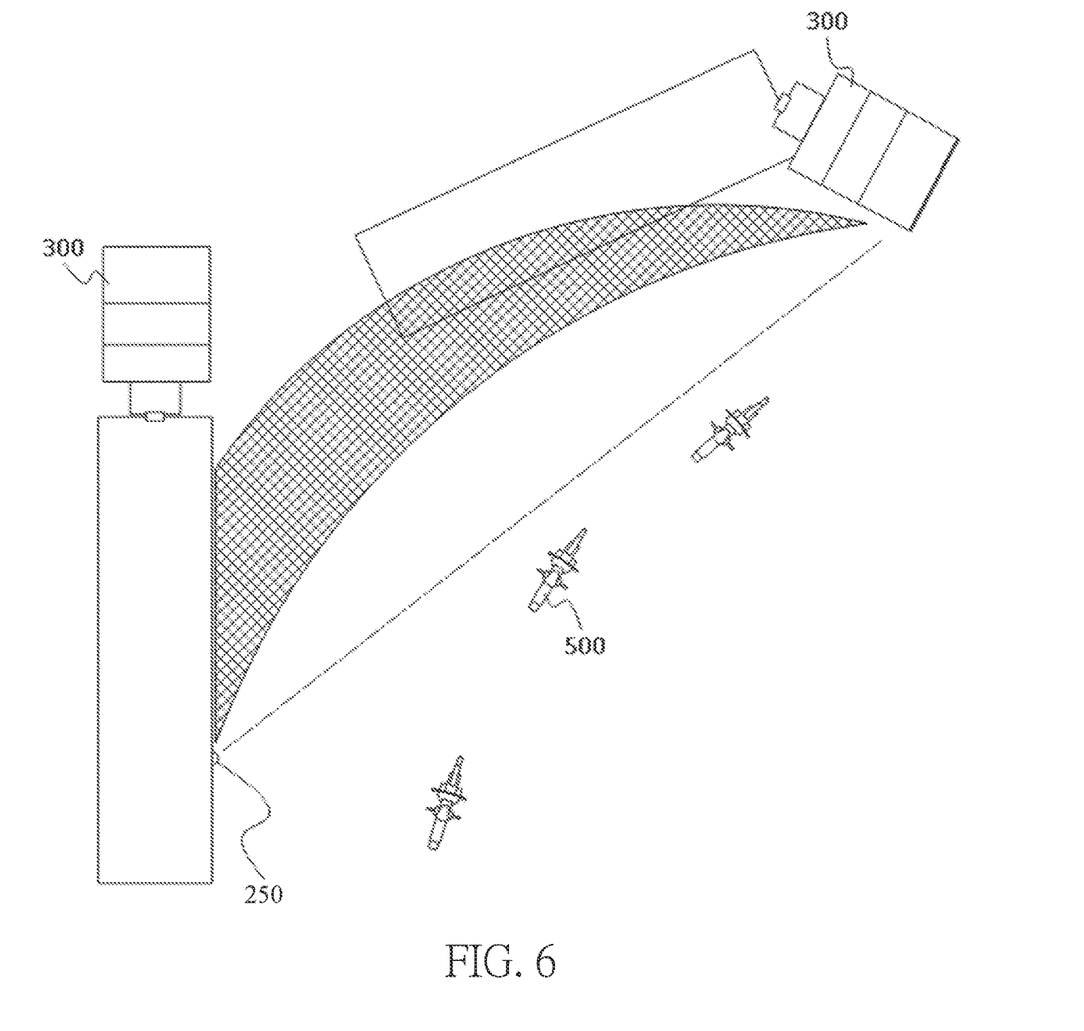
FIG. 6 is an application example diagram of a blind spot detector according to the present disclosure.

Furthermore, in order to allow the object to be able to dodge, the control unit 200 is further connected to a steering angle detector 260 and a rotating speed detector 270. The steering angle detector 260 can be arranged at a steering wheel 301 of the vehicle 300, and the steering angle detector 260 is capable of detecting a turning angle of the steering wheel 301 of the vehicle 300. The rotating speed detector 270 can be arranged at a wheel 302 of the vehicle 300, and the rotating speed detector 270 is capable of detecting a rotational speed of the wheel of the vehicle 300. The steering angle detector 260 and the rotating speed detector 270 are configured to be activated after the object is detected by the blind spot detector 250.

The control unit 200 is further configured to determine whether, after the steering angle detector 260 and the rotating speed detector 270 are activated, the turning angle of the steering wheel of the vehicle 300 is greater than a predetermined angle and the rotational speed of the wheel of the vehicle 300 is higher than a predetermined speed. If yes, then the control unit 200 sends out a second audible and visual warning message through the internal audible alarm 220 and the second visual alarm 240, so as to actively warn the vehicle driver that the turning angle and the rotational speed become too large for the object to dodge. If not, the steering angle detector 260 and the rotating speed detector 270 also remain activated until no object is detected.

Figure 5:
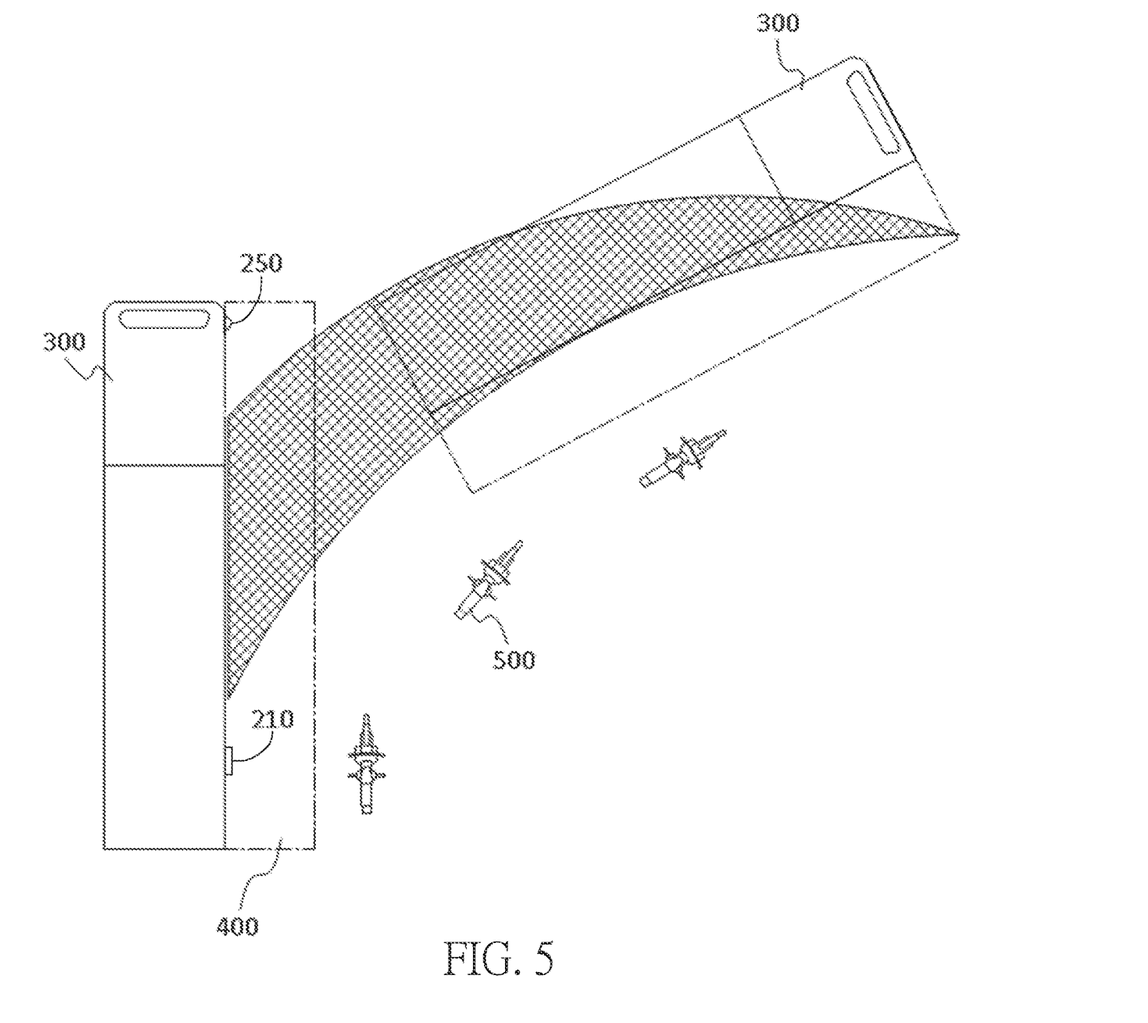
FIG. 5 is a reference diagram of a warning area change when a vehicle is turning according to the present disclosure.

Moreover, when vehicle 300 turns, according to the difference of the vehicle body, the difference of radius between inner wheels will be different. Therefore, the predetermined angle and predetermined speed stored in the control unit 200 can be properly adjusted according to the difference of radius between inner wheels.

Figure 7:
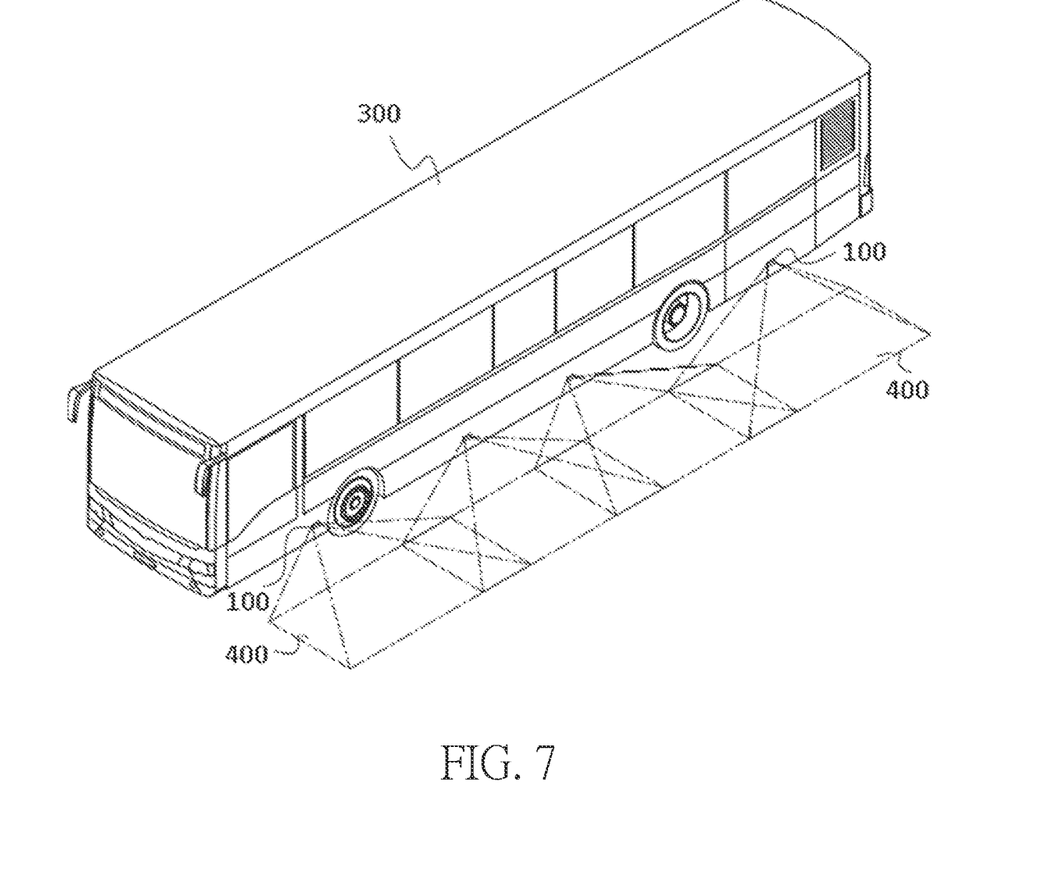
FIG. 7 is an application example diagram of a plurality of composite lamps arranged on one side of a vehicle according to the present disclosure.

Referring to FIG. 7, in addition to adjusting the size of the composite lamp 100 according to the length of the vehicle 300, or for the vehicle 300 that is too long, a plurality of composite lamps 100 can be simultaneously arranged on one side of the vehicle 300, so that the light rays projected by the plurality of composite lamps 100 overlap each other to form the warning area 400 conforming to the size of the vehicle 300.

Figure 8:
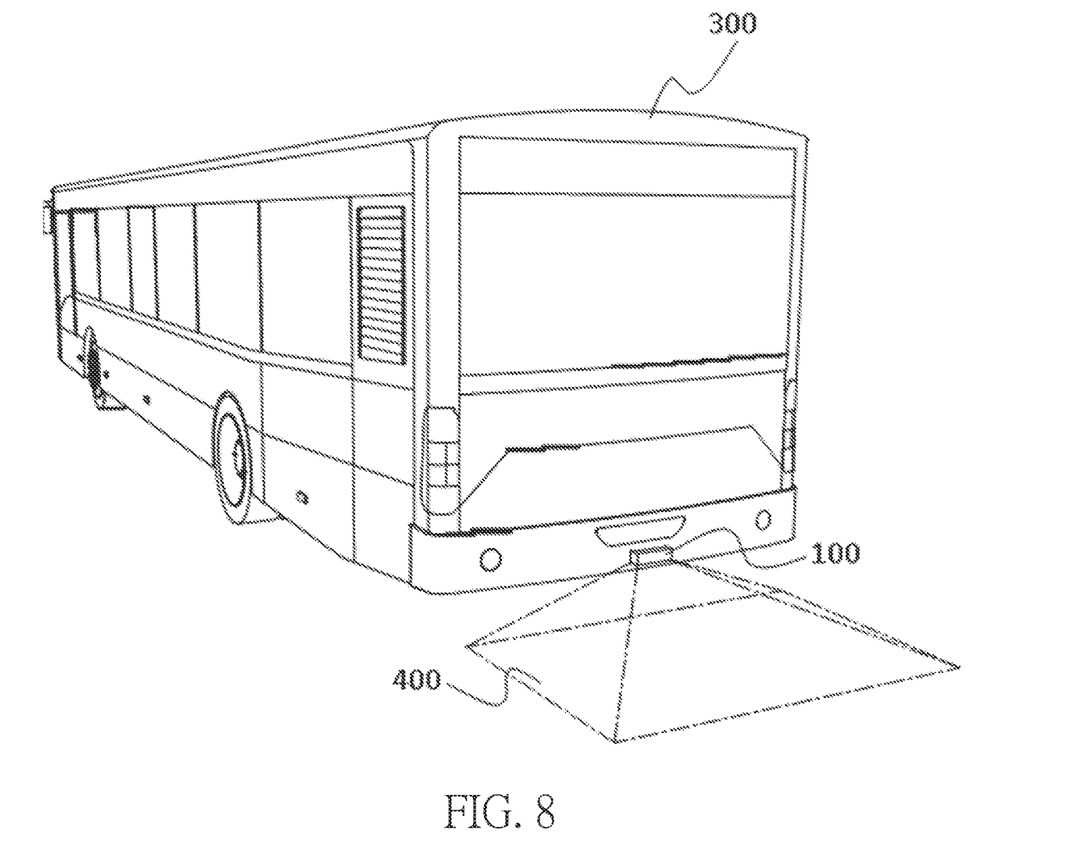
FIG. 8 is an application example diagram of a composite lamp arranged behind the vehicle according to the present disclosure.

As shown in FIG. 8, in addition to the side of the vehicle 300, the invention also sets the composite lamp 100 behind the vehicle 300 to project a warning area 400 thereof as a warning function for reversing or reverse turning.

To sum up the above description, the functions that can be achieved by the invention have been clearly shown. Of course, there are many types of the range indicator light 110, the contour indicator light 120, and the text or pattern indicator light 130, such as LED lights, laser lights or halogen lights. All those that can perform effective lighting functions belong to the patent application scope of the invention.

The invention can be applied to any vehicle 300, but is mainly applied to large vehicles 300, such as large passenger vehicles, buses, trucks, dump trucks, tour buses, tractor-full trailers, tractor-semi trailers or freight cars, etc., and there is no restriction here.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-lighting projection warning device for vehicle turning, comprising:
   a composite lamp combined with a range indicator light, a contour indicator light, and a text or pattern indicator light; and
   a control unit connected to the composite lamp to enable functions of controlling rotation and start-stop lighting of the composite lamp;
   wherein the composite lamp is arranged on one side of a vehicle and projects lighting to a visual blind spot when the vehicle is turning to form a warning area;
   wherein the range indicator light is used to illuminate an entire range of the warning area;
   wherein the contour indicator light is used to clearly mark a contour of the warning area;
   wherein the text or pattern indicator light projects text or pattern on the warning area to enhance warning effect;
   wherein the control unit is connected to an external audible alarm, an internal audible alarm, a first visual alarm and a second visual alarm;
   wherein the control unit is further connected to a blind spot detector, a steering angle detector and a rotating speed detector, the blind spot detector is for detecting an object which is entering the warning area, the steering angle detector is for detecting a turning angle of a steering wheel of the vehicle, the rotating speed detector is for detecting a rotational speed of a wheel of the vehicle, and the steering angle detector and the rotating speed detector are configured to be activated after the object is detected by the blind spot detector;
   wherein the control unit is configured to send out a first audible and visual warning message through the external audible alarm, the internal audible alarm and the first visual alarm when the object is detected by the blind spot detector;
   wherein the control unit is further configured to determine whether, after the steering angle detector and the rotating speed detector are activated, the turning angle of the steering wheel of the vehicle is greater than a predetermined angle and the rotational speed of the wheel of the vehicle is higher than a predetermined speed;
   wherein, when the turning angle of the steering wheel of the vehicle is greater than the predetermined angle and the rotational speed of the wheel of the vehicle is higher than the predetermined speed, the control unit sends out a second audible and visual warning message through the internal audible alarm and the second visual alarm.

2. The multi-lighting projection warning device for vehicle turning of claim 1, wherein the predetermined angle and the predetermined speed are adjustable by the control unit according to a difference of radius between inner wheels.

3. The multi-lighting projection warning device for vehicle turning of claim 1, wherein the control unit separately or simultaneously adjusts color, brightness, clarity, and flashing of the range indicator light, the contour indicator light, and the text or pattern indicator light.

4. The multi-lighting projection warning device for vehicle turning of claim 1, wherein the control unit controls rotation of the text or pattern indicator light to move or change the text or pattern within the entire range of the warning area.

5. The multi-lighting projection warning device for vehicle turning of claim 1, wherein the control unit is connected to a parameter unit which records model and length of the vehicle, so that the control unit can automatically adjust a projection direction and a range of the composite lamp to generate a best of the warning area of the vehicle.

6. The multi-lighting projection warning device for vehicle turning of claim 1, wherein a lampshade is arranged on an outside of the composite lamp, and a knob is arranged on an outside of the lampshade, an angle of the composite lamp is adjustable by cooperation of the knob and the control unit so as to automatically adjust a range of the warning area.

7. The multi-lighting projection warning device for vehicle turning of claim 6, wherein a slit is arranged on the lampshade, so that an adjustable light ray of the contour indicator light passes through the slit to automatically project a brighter sharper line to define a side edge portion of the warning area that is adjustable.

8. The multi-lighting projection warning device for vehicle turning of claim 1, wherein a plurality of composite lamps are simultaneously arranged on one side of the vehicle, so that light rays projected by the plurality of composite lamps overlap each other to form the warning area conforming to a size of the vehicle.

9. The multi-lighting projection warning device for vehicle turning of claim 1, wherein the composite lamp is additionally arranged behind the vehicle to project a warning area thereof.

* * * * *